United States Patent
Kuroda et al.

(10) Patent No.: US 6,484,523 B2
(45) Date of Patent: Nov. 26, 2002

(54) VEHICLE AIR CONDITIONER WITH REFRIGERANT FLOW-AMOUNT CONTROL OF COMPRESSOR

(75) Inventors: Yasutaka Kuroda, Anjo (JP); Yoshitaka Tomatsu, Chiryu (JP); Ryo Kobayashi, Kariya (JP); Masafumi Nakashima, Anjo (JP); Toshio Hirata, Haguri-gun (JP)

(73) Assignee: DENSO Corporation, Kariya (JP)

( * ) Notice: Subject to any disclaimer, the term of this patent is extended or adjusted under 35 U.S.C. 154(b) by 0 days.

(21) Appl. No.: 09/924,776

(22) Filed: Aug. 8, 2001

(65) Prior Publication Data

US 2002/0023451 A1 Feb. 28, 2002

(30) Foreign Application Priority Data

Aug. 28, 2000 (JP) .................................. 2000-257524
Apr. 18, 2001 (JP) .................................. 2001-120159
May  8, 2001 (JP) .................................. 2001-137825

(51) Int. Cl.⁷ ............................................... F25B 41/04
(52) U.S. Cl. ..................................... 62/228.3; 62/228.5
(58) Field of Search ............................ 62/228.5, 228.3

(56) References Cited

U.S. PATENT DOCUMENTS

| | | | | |
|---|---|---|---|---|
| 4,103,506 A | | 8/1978 | Adalbert et al. | ............... 62/61 |
| 4,894,999 A | * | 1/1990 | Kaiju et al. | .................... 62/158 |
| 4,934,157 A | * | 6/1990 | Suzuki et al. | ............... 62/228.5 |
| 4,959,974 A | * | 10/1990 | Kusakabe | ..................... 62/157 |
| 5,027,612 A | * | 7/1991 | Terauchi | .................. 417/222.2 |
| 5,653,119 A | * | 8/1997 | Kimura et al. | ................. 62/197 |
| 5,694,784 A | * | 12/1997 | Frey et al. | .................. 62/228.5 |
| 6,105,380 A | * | 8/2000 | Yokomachi et al. | .......... 62/114 |
| 6,260,369 B1 | * | 7/2001 | Yokomachi et al. | ....... 62/228.3 |

FOREIGN PATENT DOCUMENTS

| | | |
|---|---|---|
| JP | A-57-70722 | 5/1982 |
| JP | A-58-105821 | 6/1983 |
| JP | A-6-328933 | 11/1994 |
| JP | 2000234811 | 8/2000 |

* cited by examiner

Primary Examiner—William E. Tapolcai
(74) Attorney, Agent, or Firm—Harness, Dickey & Pierce, PLC

(57) ABSTRACT

In a vehicle air conditioner having a refrigerant cycle using carbon dioxide as refrigerant, a displacement of a compressor is changed and controlled, so that an air temperature immediately after passing through an evaporator becomes approximately 0° C., and it can prevent a refrigerant amount discharged from the compressor from being larger than a predetermined flow amount. Because the refrigerant amount discharged from the compressor is controlled to be not larger than the predetermined flow amount, it can prevent a high-pressure side refrigerant pressure and a high-pressure side refrigerant temperature from being excessively increased in the refrigerant cycle.

21 Claims, 11 Drawing Sheets

VEHICLE AIR CONDITIONER WITH REFRIGERANT FLOW-AMOUNT CONTROL OF COMPRESSOR

CROSS-REFERENCE TO RELATED APPLICATION

This application is related to Japanese Patent Applications No. 2000-257524 filed on Aug. 28, 2000, No. 2001-120159 filed on Apr. 18, 2001, and No. 2001-137825 filed on May 8, 2001, the contents of which are hereby incorporated by reference.

BACKGROUND OF THE INVENTION

1. Field of the Invention

The present invention relates to a vapor-compression refrigerant cycle in which a refrigerant pressure discharged from a compressor becomes equal to or larger than critical pressure of refrigerant. More particularly, the present invention relates to a maximum flow-amount control of refrigerant discharged from the compressor, and is suitably used for a vehicle air conditioner.

2. Description of Related Art

A compressor of a vehicle air conditioner is generally operated by driving force of a vehicle engine. Therefore, it is difficult to control a rotation speed of a compressor (i.e., a flow amount of refrigerant discharged from the compressor).

For example, in JP-A-58-105821, a variable-displacement compressor, in which a theoretical flow amount of refrigerant discharged from the compressor is variable, is used, and the theoretical flow amount discharged from the compressor is controlled in accordance with an engine rotation speed or a rotation speed of the compressor.

However, in a vapor-compression refrigerant cycle where a high-pressure side refrigerant pressure becomes equal to or higher than the critical pressure of refrigerant, the high-pressure side refrigerant pressure is high. For example, when carbon dioxide is used as refrigerant, the high-pressure side refrigerant pressure is 15 MPa. Accordingly, when the engine rotation speed increases, a consumed power of the compressor becomes larger, as compared with a vapor-compression refrigerant cycle using flon as refrigerant. Therefore, an engine load becomes larger, and travelling performance (e.g., acceleration performance) of the vehicle is deteriorated. In addition, when the engine rotation speed increases, the temperature of refrigerant discharged from the compressor becomes higher, and a thermal damage of the compressor or a rubber member may be caused.

SUMMARY OF THE INVENTION

In view of the foregoing problems, it is an object of the present invention to provide a refrigerant cycle for a vehicle air conditioner, which prevents a consumed power of a compressor from being excessively increased.

According to the present invention, in a refrigerant cycle for a vehicle air conditioner, a compressor is operated by power from an engine, and the compressor is disposed to suck and compress refrigerant so that refrigerant discharged from the compressor has a pressure equal to or higher than critical pressure of refrigerant. In the refrigerant cycle, a control unit is disposed to prevent a flow amount of refrigerant discharged from the compressor from becoming larger than a predetermined value. Because the flow amount of refrigerant discharged from the compressor is made not larger than the predetermined value, it can prevent a high-pressure side refrigerant pressure and a high-pressure side refrigerant temperature from being excessively increased with an increase of a rotation speed of the engine. Accordingly, the refrigerant cycle operates while preventing a consumed power of the compressor from being excessively increased, and it can prevent the compressor from being damaged.

Preferably, the compressor is a variable-displacement compressor in which a theoretical flow amount of refrigerant discharged from the compressor is variable, and the control unit controls the theoretical flow amount of refrigerant discharged from the compressor to prevent the flow amount of refrigerant discharged from the compressor from being larger than the predetermined value. Further, a fixed throttle is provided at a refrigerant discharge side of the compressor, and the theoretical flow amount is controlled based on a pressure difference between upstream and downstream sides of the fixed throttle in a refrigerant flow direction. Because the theoretical flow amount is controlled based on the pressure difference between upstream and downstream sides of the fixed throttle, the flow amount of refrigerant discharged from the compressor is not reduced even when an outside heat exchanger is frosted. Accordingly, it can prevent heat-absorbing capacity (heating capacity) of the outside heat exchanger from being reduced in a heating operation, when the outside heat exchanger is frosted. More preferably, the control unit is set in such a manner that the flow amount of refrigerant discharged from the compressor has an upper limit. Therefore, by suitably setting the upper limit, the consumed power of the compressor can be reduced, while the refrigerant cycle is normally operated.

BRIEF DESCRIPTION OF THE DRAWINGS

Additional objects and advantages of the present invention will be more readily apparent from the following detailed description of preferred embodiments when taken together with the accompanying drawings, in which.

DETAILED DESCRIPTION OF THE PRESENTLY PREFERRED EMBODIMENTS

Preferred embodiments of the present invention will be described hereinafter with reference to the accompanying drawings.

Figure 1:
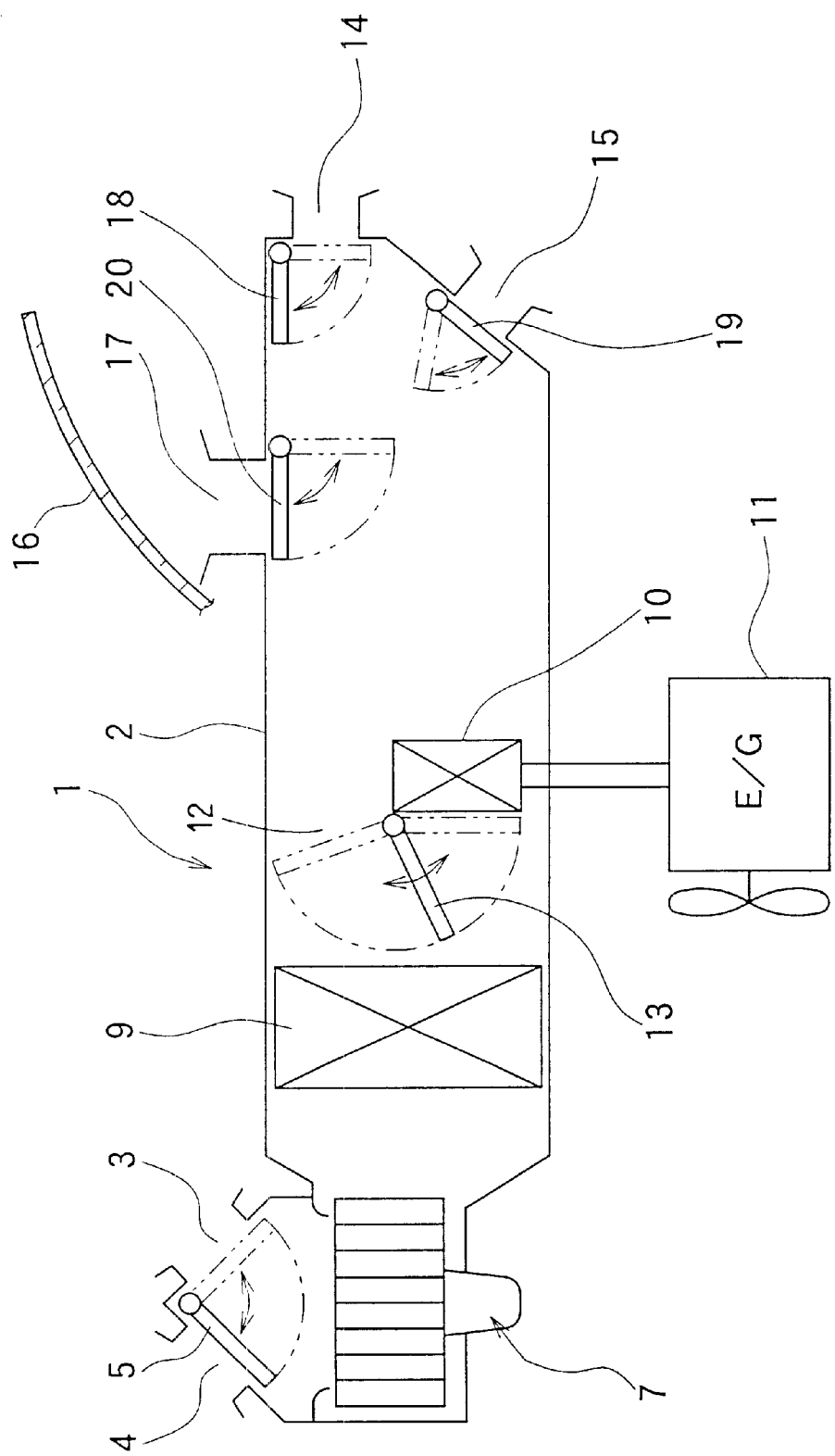
FIG. 1 is a schematic diagram showing a vehicle air conditioner according to a first preferred embodiment of the present invention.

A first preferred embodiment of the present invention will be now described with reference to FIGS. 1–7. In the first embodiment, the present invention is typically applied to a vehicle air conditioner. As shown in FIG. 1, at an upstream position of an air conditioning casing 2 defining an air passage, an inside air suction port 3 from which inside air inside a passenger compartment is sucked, and an outside air suction port 4 from which outside air outside the passenger compartment is sucked are provided. A suction port switching door (inside/outside air switching unit) 5 for adjusting an opening ratio of the suction ports 3, 4 is provided in the air conditioning casing 2.

A filter (not shown) for removing dust contained in air and a centrifugal blower 7 for blowing air are disposed at 5 a downstream air side of the suction port switching door 5. An evaporator 9 for cooling air is disposed at a downstream air side of the blower 7 so that all air blown by the blower 7 passes through the evaporator 9. The evaporator 9 is a low-pressure side heat exchanger of a super-critical (trans-critical) vapor-compression refrigerant cycle in which a refrigerant pressure (high-pressure side refrigerant pressure) discharged from a compressor 100 becomes equal to or higher than the critical pressure of refrigerant. Refrigerant is evaporated in the evaporator 9 by absorbing heat from air, so that air passing through the evaporator 9 is cooled. In this first embodiment, carbon dioxide is used as refrigerant, for example.

A heater core 10 for heating air is disposed in the air conditioning casing 2 at a downstream air side of the evaporator 9. The heater core 10 heats air passing therethrough using cooling water as a heating source. The heater core 10 is disposed in the air conditioning casing 2 to form a bypass passage 12 through which air bypasses the heater core 10. At an upstream air side of the heater core 10, an air mixing door 13 for adjusting a ratio between an air amount passing through the heater core 10 and an air amount passing through the bypass passage 12 is disposed.

At a most downstream air side of the air conditioning casing 2, there is provided a face air outlet 14 through which air is blown toward the upper side of a passenger in a passenger compartment, a foot air outlet 15 through which air is blown toward the foot are of the passenger in the passenger compartment, and a defroster air outlet 17 through which air is blown toward an inner surface of a windshield 16 of the vehicle.

Figure 2:
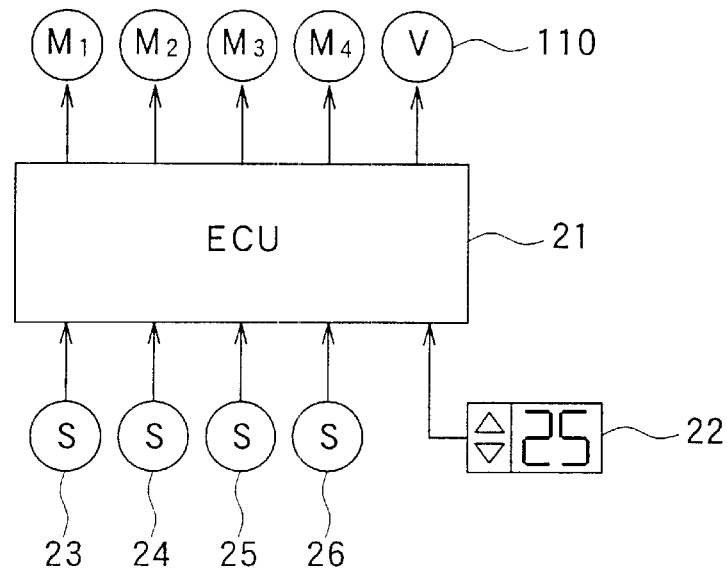
FIG. 2 is a schematic diagram showing a control unit of the air conditioner according to the first embodiment.

Mode switching doors 18, 19, 20 for selectively switching an air outlet mode are disposed at upstream air sides of the air outlets 14, 15, 17 to open and close the air outlets 14, 15, 17, respectively. The mode switching doors 18, 19, 20, the suction port switching door 5 and the air mixing door 13 are driven and controlled by driving members M1–M3 such as servomotors. The driving members M1–M3, a driving member M4 for driving the blower 7, and the control valve 110 are controlled by an electronic control unit (ECU) 21, as shown in FIG. 2.

In addition, into the ECU 21, a set temperature Tset set by a temperature setting unit 22, and air-conditioning sensor signals from a sensor group are input. The sensor group includes an inside air temperature sensor 23 (inside air temperature detecting unit) for detecting temperature Tin of inside air inside the passenger compartment, an outside air temperature sensor 24 (an outside air temperature detecting unit) for detecting temperature Tout of outside air outside the passenger compartment, a sunlight sensor 25 for detecting a sunlight amount entering into the passenger compartment, and an evaporator air temperature sensor 26 (temperature detecting unit) for detecting temperature (post-evaporator air temperature Te) of air immediately after passing through the evaporator 9.

Figure 3:
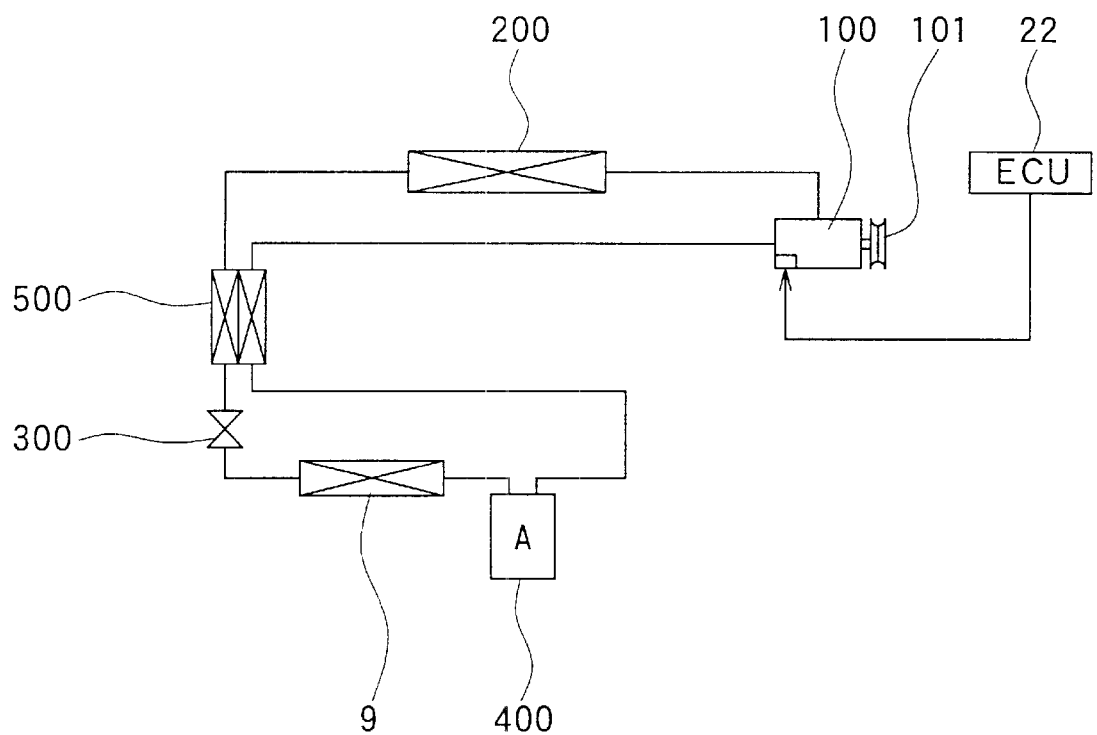
FIG. 3 is a schematic diagram showing a refrigerant cycle used for the air conditioner according to the first embodiment.

Next, the refrigerant cycle of the first embodiment will be now described. As shown in FIG. 3, the refrigerant cycle includes a compressor 100 which sucks and compresses refrigerant by a driving force from an engine 11 for traveling the vehicle, a radiator 200, a pressure control unit (decompression unit) 300, the evaporator 9, an accumulator 400, and an inside heat exchanger 500.

The radiator 200 is disposed to perform a heat exchange between high-temperature high-pressure refrigerant discharged from the compressor 100 and outside air, so that refrigerant discharged from the compressor 100 is cooled in the radiator 200. The pressure control unit 300 decompresses refrigerant flowing from the radiator 200, and controls the high-pressure side refrigerant pressure (pressure discharged from the compressor 100) based on a refrigerant temperature at a refrigerant outlet of the radiator 200.

The accumulator 400 is disposed for separating refrigerant flowing from the evaporator 9 into gas refrigerant and liquid refrigerant, so that gas refrigerant is introduced toward a suction side of the compressor 100 while surplus refrigerant in the refrigerant cycle is stored therein. The inside heat exchanger 500 is disposed to perform a heat exchange between refrigerant flowing from the accumulator and high-pressure side refrigerant (e.g., refrigerant flowing from the radiator, in the first embodiment). Accordingly, the enthalpy of refrigerant flowing into the evaporator 9 can be reduced, an enthalpy difference between refrigerant at an inlet side and refrigerant an outlet side of the evaporator 9 can be increased, and it can prevent liquid refrigerant from being sucked into the compressor 100.

Next, the structure of the compressor 100 will be now described.

Figure 4:
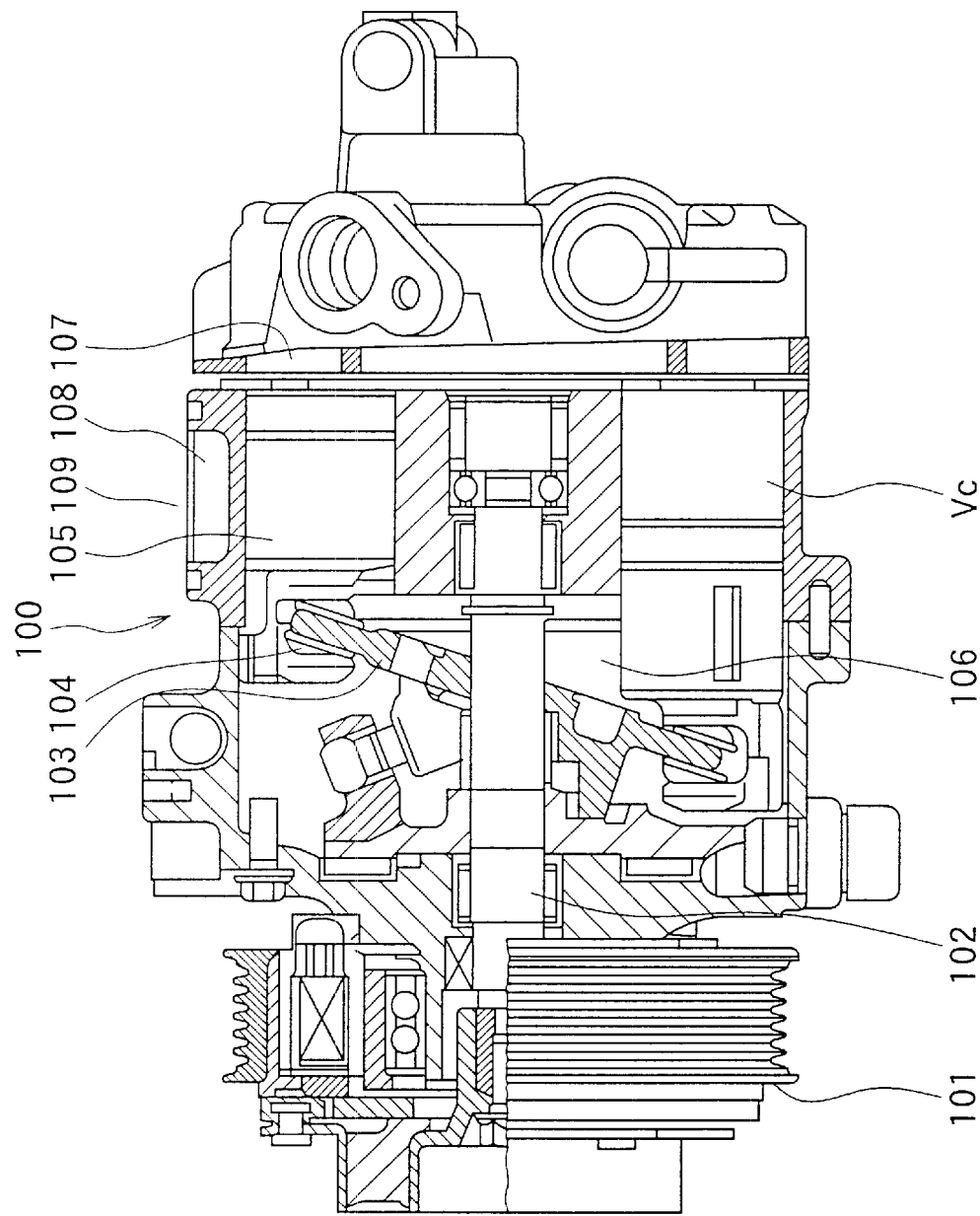
FIG. 4 is a sectional view of a compressor used for the refrigerant cycle according to the first embodiment.

As shown in FIG. 4, the compressor 100 is a variable-displacement swash plate compressor. In the variable-displacement swash plate compressor 100, a swash plate 103 tilted relative to a rotation shaft 102 is disposed to be integrally rotated with the shaft 102, and plural pistons (e.g., six pistons in the first embodiment) 105 are connected to the swash plate 103 through shoes 104. Therefore, the pistons 105 reciprocates, and a volume of an operation chamber Vc is enlarged and reduced, so that the compressor 100 sucks and compresses refrigerant. When a displacement of the compressor 100 is changed, a pressure inside a swash plate chamber (control pressure chamber) 106 in which the swash plate 103 is disposed is changed, a tilt angle of the swash plate 103 is changed, and a reciprocating stroke of the pistons 105 is changed. The swash plate chamber 106 communicates with a suction side of the compressor 100 through a passage having a fixed throttle such as an orifice.

Refrigerant discharged from each operation chamber Vc is collected in a first discharge chamber 107, so that a vibration of refrigerant discharged from each operation chamber Vc can be reduced in the first discharge chamber 107. Refrigerant in the first discharge chamber 107 is introduced into a discharge port 109 through a second discharge chamber 108, and both the first and second discharge chambers 107, 108 communicate with each other through a communication passage (not shown) having a predetermined radial dimension. Therefore, refrigerant passing through the communication path generates a pressure loss, so that pressure within the second discharge chamber 108 becomes lower than pressure within the first discharge chamber 107.

Figure 5:
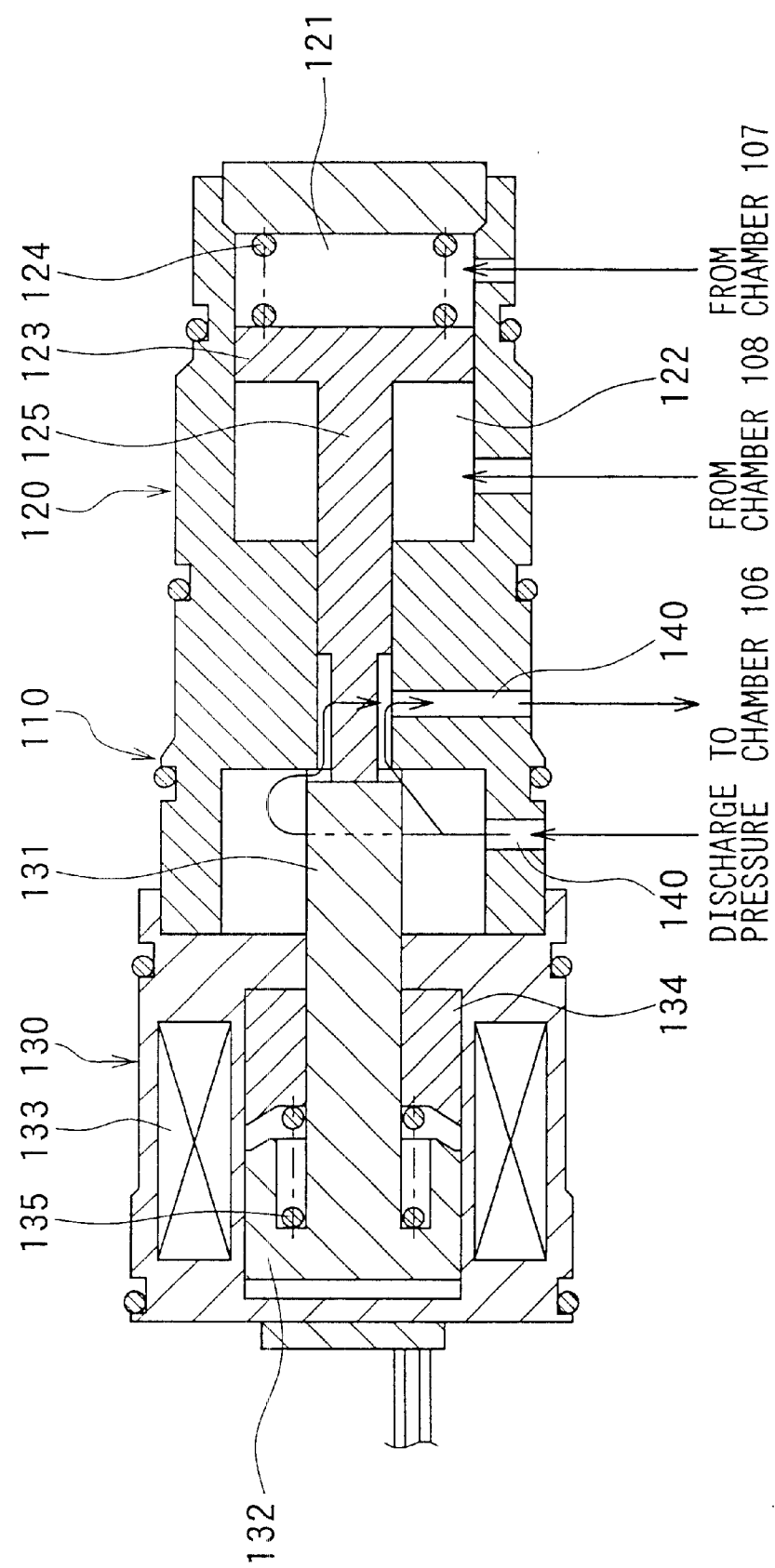
FIG. 5 is a sectional view of a control valve used for the refrigerant cycle according to the first embodiment.

FIG. 5 is a sectional view showing a control valve 110 (displacement control unit) for controlling the pressure within the swash plate chamber 106. The control valve 110 is constructed by a first control portion 120 and a second control portion 130. The first control portion 120 is operated so that a pressure difference between the first discharge chamber 107 and the second discharge chamber 108 becomes a predetermined pressure difference (i.e., control target pressure difference) ΔP, and the second control portion 130 regulates the operation of the first control portion 120 to control the control target pressure difference ΔP.

First, the first control portion 120 is described. The first control portion 120 includes a first control chamber 121 into which pressure within the first discharge chamber 107 is introduced, and a second control chamber 122 into which the pressure within the second discharge chamber 108 is introduced. Both the control chambers 121, 122 are partitioned from each other by a slidable partition member 123. A coil spring (elastic member) 124 for pressing the partition member 123 in a direction increasing the volume of the first control chamber 121 is disposed in the first control chamber 121. A push rod 125 is formed in the partition member 123, so that a force due to the pressure difference between both the control chambers 121, 122 and an elastic force of the coil spring 124 is applied to the push rod 125. The force due to the pressure difference between both the control chambers 121, 122, is toward a direction (left direction in FIG. 5) for increasing the volume of the first control chamber 121, because the pressure within the first control chamber 121 is larger than the pressure within the second control chamber 122. Because a moving amount of the push rod 125 is slight, the force applied from the coil spring 124 to the partition member 123 (push rod 125) is substantially constant.

On the other hand, the second control portion 130 is disposed so that a force (i.e., valve-closing force) opposite to a valve-opening force is applied to a valve body 131. Therefore, the valve body 131 controls a communication state of a control pressure passage 140 through which the discharge pressure (i.e., pressure of the second discharge chamber 108) of the compressor 100 is introduced into the swash plate chamber 106.

The second control portion 130 includes a plunger 132 (movable core) which is movable by an electromagnetic absorbing force generated by a magnetic field due to a coil 133, a stopper (fixed coil) 134 engaged with the plunger 132, and a coil spring 135 generating a force opposing the electromagnetic absorbing force. Because a movement amount of the plunger 132 is slight, a force applied from the coil spring 135 to the plunger 132 is substantially constant.

In addition, the plunger 132 is integrated with the valve body 131. By controlling an energizing ratio (duty ratio) supplied to the coil 133, the valve closing force (electromagnetic-absorbing force) approximately proportional to the duty ratio can be obtained. The duty ratio supplied to the coil 133 us controlled by the ECU 21.

Thus, when the duty ratio is made larger and the valve-closing force is increased, the valve body 131 moves the right side of FIG. 5, and a passage area of the control pressure passage 140 is reduced. Therefore, the pressure within the swash plate chamber 106 is reduced, and the displacement of the compressor 100 is reduced.

On the other hand, when the rotation speed of the engine 11 increases and the rotation speed of the compressor 100 increases, the flow amount of refrigerant discharged from the compressor 100 increases. However, when the refrigerant flow amount discharged from the compressor 100 increases, a pressure difference between both the first and second control chambers 121, 122 becomes larger. Accordingly, the valve opening force becomes larger, the push rod 125 and the valve body 131 move toward the left side in FIG. 5, the control pressure passage 140 is opened, and the displacement of the compressor 100 is reduced.

Conversely, when the rotation speed of the engine 11 decreases and the rotation speed of the compressor 100 decreases, the flow amount of refrigerant discharged from the compressor 100 decreases. However, when the refrigerant flow amount discharged from the compressor 100 decreases, a pressure difference between both the first and second control chambers 121, 122 becomes smaller. Accordingly, the valve opening force becomes smaller, the push rod 125 and the valve body 131 move toward the right side in FIG. 5, the control pressure passage 140 is throttled, and the displacement of the compressor 100 is increased.

At this time, the push rod 125 and the valve body 131 move to a position at which the valve closing force and the valve opening force are balanced. Further, the force due to the coil springs 124, 135 is constant. Therefore, by moving the push rod 125 and the valve body 131 to the balanced position, the displacement of the compressor 100 can be mechanically changed so that the pressure difference between the first and second control chambers 121, 122 becomes a predetermined pressure difference determined by the valve-closing force (i.e., electromagnetic absorbing force), i.e., the control target pressure difference Δp.

Accordingly by controlling the duty ratio, the refrigerant flow amount actually discharged from the compressor 100 can be controlled, without depending on the rotation speed of the engine E/G (compressor 100). In the first embodiment, a target refrigerant flow amount discharged from the compressor 100 is determined by the duty ratio. Therefore, the determination of the duty ratio means the determination of the target refrigerant flow amount discharged from the compressor 1.

Figure 6:
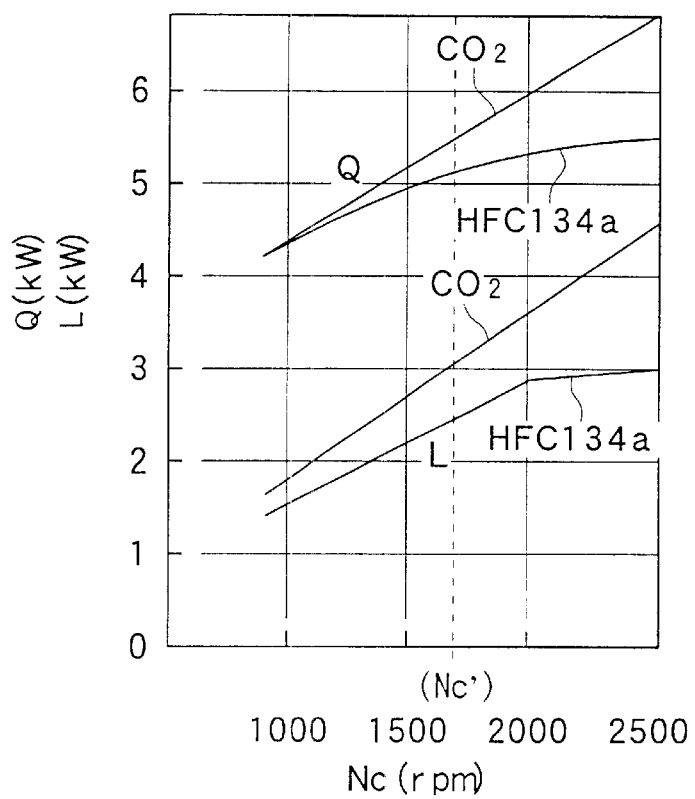
FIG. 6 is a graph showing relationships between a rotation speed Nc of the compressor, and a cooling capacity Q and a consumed power L, according to the first embodiment.

Next, operation of the refrigerant cycle according to the first embodiment will be now described. FIG. 6 is a graph showing a relationship between the rotation speed Nc of the compressor 100, and a cooling capacity Q and a consumed power L of the super-critical refrigerant cycle using carbon dioxide as refrigerant, and a relationship between the rotation speed Nc of the compressor 100, and the cooling capacity Q and the consumed power L of a refrigerant cycle using flon (HFC134a) as refrigerant. As shown in FIG. 6, in the super-critical refrigerant cycle using carbon dioxide as refrigerant, an increase amount of the cooling capacity Q relative to an increase amount of the rotation speed Nc of the compressor 100 becomes larger as compared with that in the refrigerant cycle using flon as refrigerant. In addition, in the non-critical refrigerant cycle using flon as refrigerant, the cooling capacity Q is increased to about 5.5 KW in maximum. However, in the super-critical refrigerant cycle, the cooling capacity Q is increased approximately in proportion to the increased amount of the rotation speed Nc of the compressor 100.

In a general vehicle air conditioner, when the maximum cooling capacity Q is approximately 5.5 KW, a necessary cooling capacity can be obtained. Accordingly, in the first embodiment, the target refrigerant flow amount discharged from the compressor 100 is set and the duty ratio is determined, so that the air temperature Te (immediately after passing through the evaporator 9) detected by the temperature sensor 26 becomes approximately 0° C. Accordingly, it can prevent the refrigerant amount discharged from the compressor 100 becomes larger than a predetermined flow amount Wt. The predetermined flow amount Wt is set and determined based on a necessary maximum cooling capacity Q (e.g., 5.5 KW, in the first embodiment) and a material performance value of refrigerant, and the like.

Figure 7:
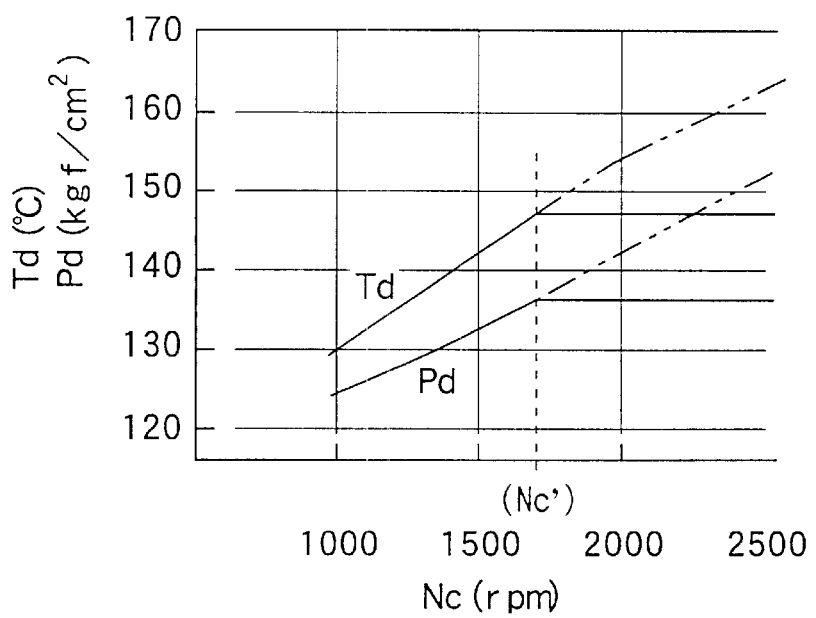
FIG. 7 is a graph showing relationships between the rotation speed Nc of the compressor, and a refrigerant temperature Td and a refrigerant pressure Pd discharged from the compressor, according to the first embodiment.

For example, when the necessary maximum cooling capacity Q is set approximately at 5.5 KW, the duty ratio (theoretical flow amount of refrigerant) is controlled so that it can prevent the actual flow amount of refrigerant discharged from the compressor 100 from becoming larger than the predetermined flow amount Wt. In this case, the rotation speed Nc (rotation number) of the compressor 100 can be restricted to be equal to or lower than a rotation speed Nc'. Therefore, it can prevent the refrigerant pressure Pd (high-pressure side refrigerant pressure) and the refrigerant temperature Td (high-pressure side refrigerant temperature) from being excessively increased, as shown in FIG. 7. As a result, it can prevent the consumed power of the compressor 100 from being excessively increased, and it can prevent the compressor 100 or a rubber member from being thermal-damaged.

According to the first embodiment of the present invention, the displacement (theoretical refrigerant flow amount) of compressor 100 is mechanically controlled by the control valve 110 (control unit) based on the pressure difference of the fixed throttle provided at the refrigerant discharge side of the compressor 100, so that the flow amount of refrigerant discharged from the compressor 100 is restricted to be not larger than the predetermined flow amount Wt. That is, because the maximum flow amount of refrigerant discharged from the compressor 100 is restricted, it can prevent the high-pressure side refrigerant pressure Pd and the high-pressure side refrigerant temperature Td from being excessively increased in the refrigerant cycle. Accordingly, the refrigerant cycle operates while preventing a consumed power of the compressor 100 from being excessively increased, and it can prevent the compressor 100 from being damaged.

A second preferred embodiment of the present invention will be now described with reference to FIGS. 8–10. In the second embodiment, the pressure difference of the fixed throttle disposed at the refrigerant discharge side of the compressor 100 is detected by a sensor such as a pressure sensor, as an electrical signal, so that displacement of the compressor 100 is controlled.

Figure 8:
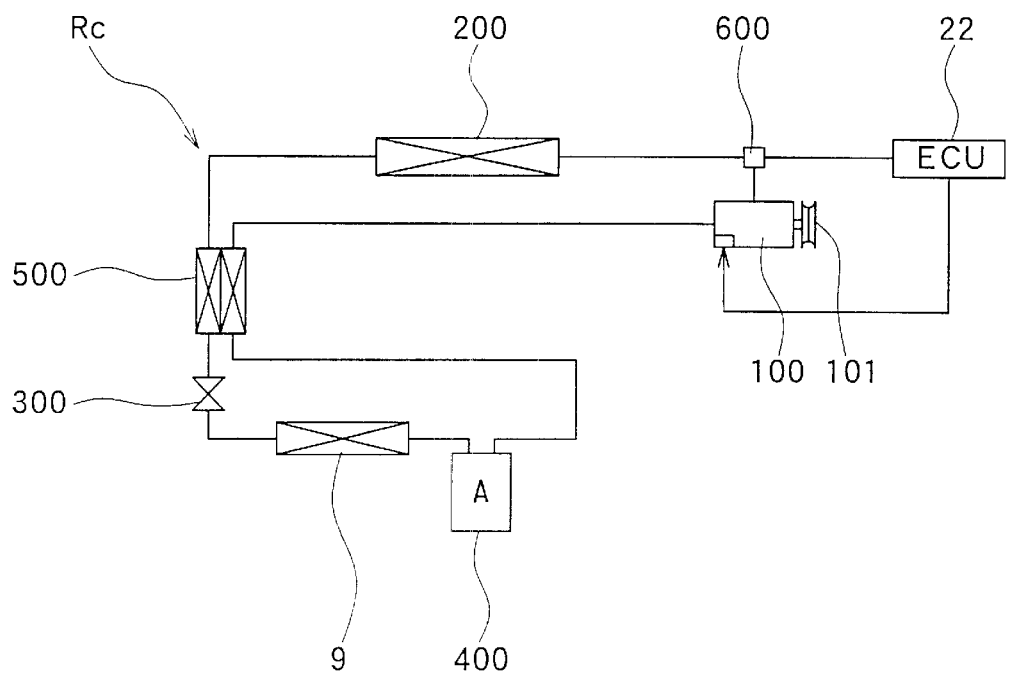
FIG. 8 is a schematic view showing a refrigerant cycle for a vehicle air conditioner according to a second preferred embodiment of the present invention.
Figure 9:
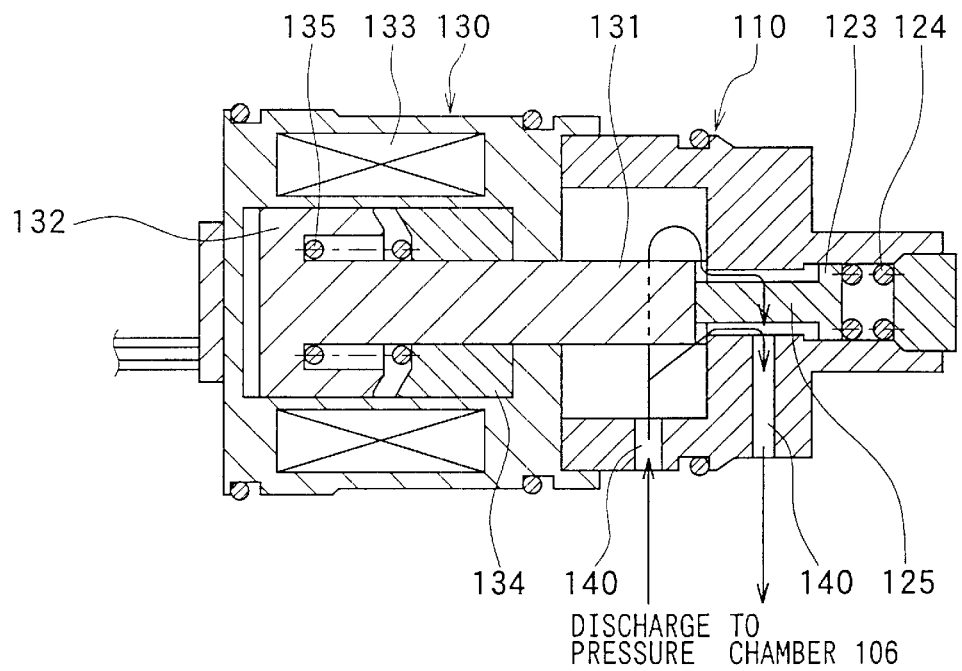
FIG. 9 is a sectional view showing a control valve used for the refrigerant cycle according to the second embodiment.

Specifically, as shown in FIG. 8, a flow amount detecting unit 600, for detecting a refrigerant flow amount (mass flow amount) discharged from the compressor 100, is disposed, and the displacement of the compressor 100 is controlled by a control valve 110 shown in FIG. 9. In the second embodiment, the compressor 100 is a variable-displacement swash plate compressor, similarly to the above-described first embodiment.

Figure 10:
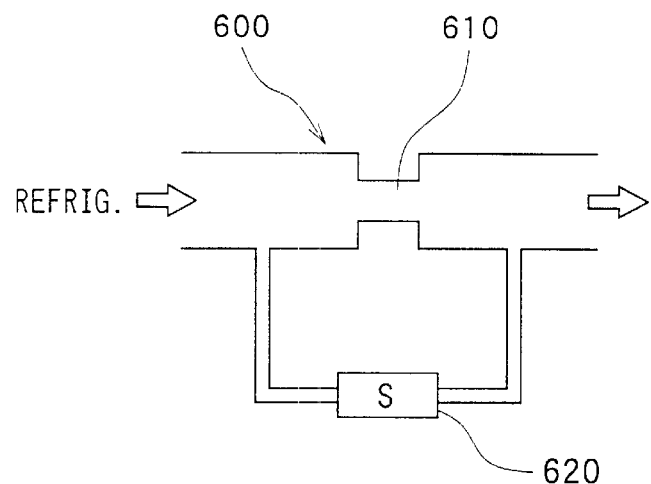
FIG. 10 is a schematic diagram showing a flow amount detecting unit for detecting a flow amount of refrigerant discharged from a compressor used in the refrigerant cycle, according to the second embodiment.

As shown in FIG. 10, the flow amount detecting unit 600 includes a fixed throttle (orifice) 610 having a predetermined fixed opening degree, and a pressure difference sensor 620 for detecting a pressure loss $\Delta P$ generated in the fixed throttle 610. That is, the pressure loss $\Delta P$ corresponds to a pressure difference between upstream and downstream sides of the fixed throttle 610 in a refrigerant flow direction.

The pressure loss $\Delta P$ is approximately proportional to the square of a flow rate of refrigerant. Accordingly, when the pressure loss $\Delta P$ is detected, the flow rate of refrigerant passing through the fixed throttle 610 can be calculated, and the flow amount of refrigerant discharged from the compressor 100 can be calculated.

That is, in the second embodiment, the pressure loss $\Delta P$ can be detected by the pressure sensor 620. Accordingly, the first control portion 120 described in the first embodiment is not provided. In the second embodiment, the refrigerant flow amount discharged from the compressor 100 is calculated based on the detection value of the pressure difference sensor 620. In addition, a target flow amount of refrigerant discharged from the compressor 100 is set based on the calculated refrigerant flow amount, and the duty ratio is controlled (feedback controlled) so that the air temperature Te (post-evaporator air temperature) detected by the temperature sensor 26 becomes approximately 0° C. Accordingly, in the second embodiment, operation effect similar to the above-described first embodiment can be obtained.

Figure 11:
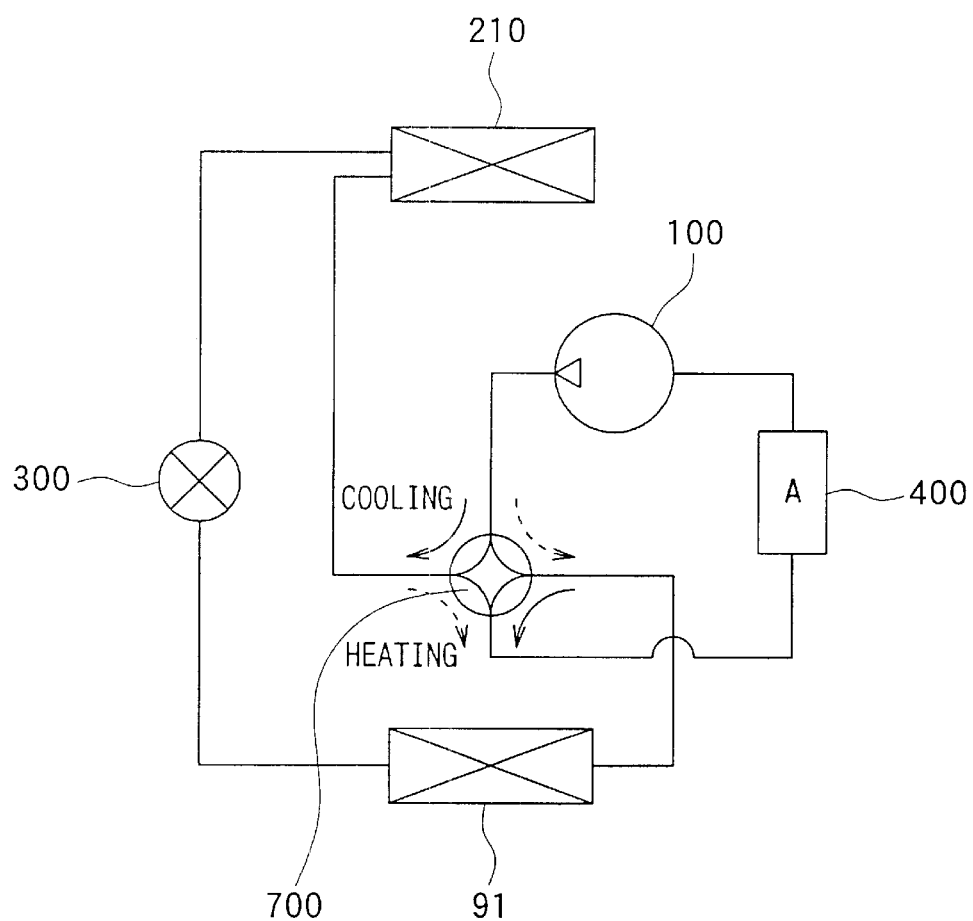
FIG. 11 is a schematic diagram showing a refrigerant cycle used for an air conditioner, according to a third preferred embodiment of the present invention.

A third preferred embodiment of the present invention will be now described with reference to FIG. 11. In the above-described first embodiment, the refrigerant cycle is used for only performing cooling operation. However, in the third embodiment, the present invention is used for a heat-pump refrigerant cycle with can selectively switch a cooling operation and a heating operation. In the third embodiment, as shown in FIG. 11, a switching valve 700 is provided to selectively switch one of a case where refrigerant discharged from the compressor 100 flows into an exterior heat exchanger 201, and a case where refrigerant discharged from the compressor 100 flows into an interior heat exchanger 91. The switching valve 700 is a four-way valve, for example.

In the third embodiment, during the cooling operation, the exterior heat exchanger 201 is used as a radiator, and the interior heat exchanger 91 is used as an evaporator. On the other hand, during the heating operation, the interior heat exchanger 91 is used as a radiator, and the exterior heat exchanger 201 is used as an evaporator.

Next operation of the refrigerant cycle according to the third embodiment of the present invention will be now described.

In the heating operation, because the exterior heat exchanger 201 is used as the evaporator, the surface of the exterior heat exchanger 201 is readily frosted. At this time, if the displacement of the compressor is controlled so that a low-pressure side refrigerant pressure sucked into the compressor 100 becomes lower than a predetermined pressure, when the exterior heat exchanger 201 is frosted, heat absorbing capacity (evaporation amount) of the exterior heat exchanger 201 is decreased.

However, in the third embodiment, because the refrigerant flow amount discharged from the compressor 100 is controlled based on the pressure difference between the upstream and downstream sides of a fixed throttle provided at the refrigerant discharge side of the compressor 100, the refrigerant flow amount discharged from the compressor 100 becomes approximately constant even when the exterior heat exchanger 201 is frosted. Accordingly, even when the exterior heat exchanger 201 is frosted in the heating operation, the refrigerant flow amount discharged from the compressor 100 is not decreased. Thus, even when the exterior heat exchanger 201 is frosted in the heating operation, it can prevent the heat-absorbing capacity (heating capacity) of the exterior heat exchanger 201 from being greatly reduced.

Figure 12:
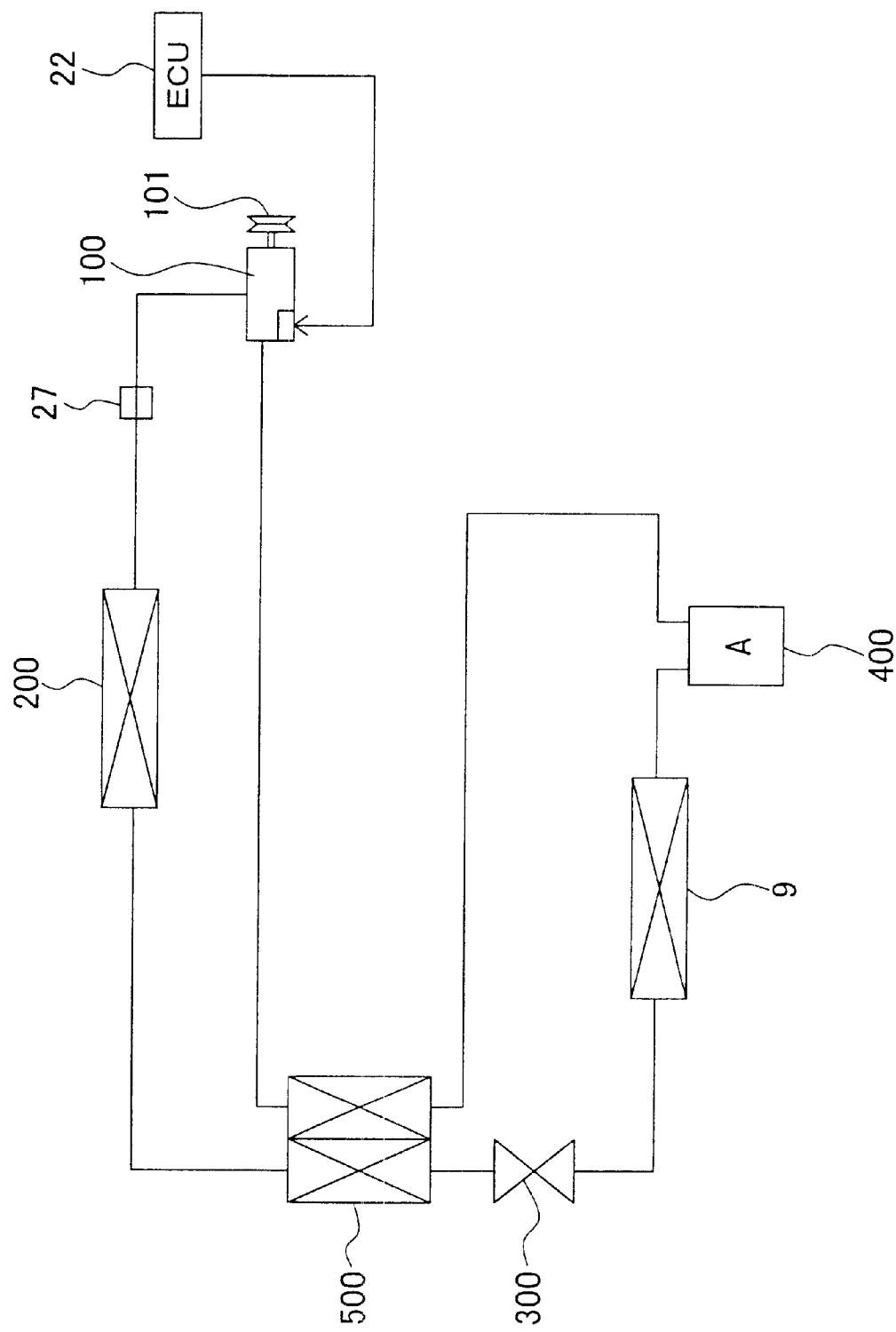
FIG. 12 is a schematic diagram showing a refrigerant cycle used for an air conditioner, according to a fourth preferred embodiment of the present invention.

A fourth preferred embodiment of the present invention will be now described with reference to FIGS. 12 and 13. In the fourth embodiment, a pressure sensor 27 for detecting the refrigerant pressure Pd discharged from the compressor 100 is provided, and a theoretical flow amount of refrigerant discharged from the compressor 100 is controlled so that the refrigerant pressure directed by the pressure sensor 27 becomes equal to or lower than a predetermined pressure P1. That is, electrical amount (duty ratio) supplied to the control valve 110 is controlled so that the refrigerant pressure Pd detected by the pressure sensor 27 becomes equal to or lower than the predetermined pressure P1. Here, the refrigerant pressure Pd detected by the pressure sensor 27 is one of physical amount relative to the refrigerant pressure discharged from the compressor 100.

Figure 13:
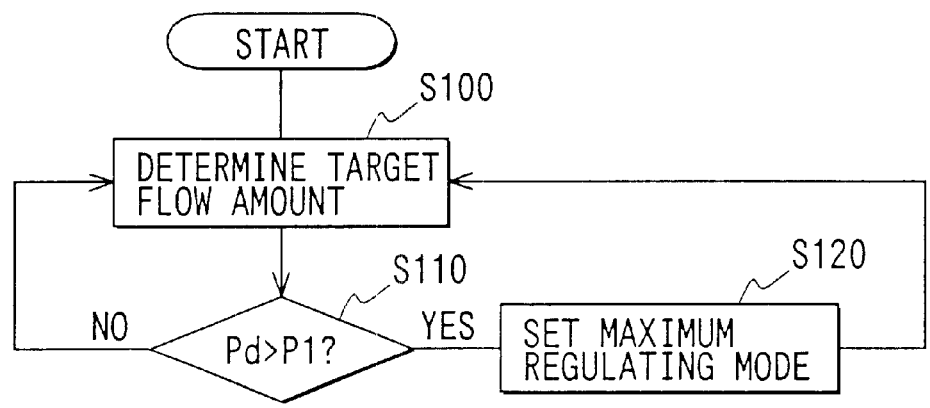
FIG. 13 is a flow diagram showing a control operation of the air conditioner according to the fourth embodiment.

Next, the control operation of the compressor 100 (control valve 110) will be now described based on the flow diagram shown in FIG. 13. When the operation of the vehicle air conditioner 1 starts, a target flow amount of refrigerant discharged from the compressor 100 is determined so that the air temperature Te immediately after passing through the evaporator 9 becomes a predetermined temperature, at step S100. Next, a theoretical flow amount (electrical power supplied to the control valve 110, duty ratio) of refrigerant discharged from the compressor 100 is controlled to be the target flow amount. Next, when the refrigerant pressure Pd detected by the pressure sensor 27 becomes larger than the predetermined value P1 at step S110, the control current value (duty ratio) for obtaining the target flow amount determined at step S100 is reduced by 5%, for example, so that the theoretical flow amount is made smaller than the determined target flow amount. That is, a maximum flow-amount regulating mode is performed at step S120. In the maximum flow-amount regulating mode at step S120, the control current value (duty ratio) for obtaining the target flow amount determined at step S100 is reduced by a predetermined ratio (e.g., 5%) so that the theoretical flow amount of refrigerant is made smaller than the determined target flow amount. In the fourth embodiment, because the maximum flow-amount regulating mode is performed so that the theoretical refrigerant flow amount is controlled to be smaller than the determined target refrigerant flow amount, it can prevent the high-pressure side refrigerant from having an abnormal high pressure or an abnormal high temperature in the refrigerant cycle.

In the fourth embodiment of the present invention, in the maximum flow-amount regulating mode, the target flow amount of refrigerant discharged from the compressor can be set in a range equal to or lower than a maximum flow amount, and the theoretical flow amount of the compressor is controlled based on the target flow amount, so that the refrigerant pressure Pd detected by the pressure sensor 27 becomes lower than the predetermined pressure P1. In this case, it can prevent the high-pressure side refrigerant from having an abnormal high pressure or an abnormal high temperature in the refrigerant cycle.

A fifth preferred embodiment of the present invention will be now described with reference to FIG. 14. In the above-described fourth embodiment, when the refrigerant pressure Pd (physical amount relative to the high-pressure side refrigerant pressure) detected by the pressure sensor 27 becomes larger than the predetermined pressure P1, the maximum flow-amount regulating mode is performed. That is, in the above-described fourth embodiment, the target flow amount of refrigerant discharged from the compressor 100 is determined so that the air temperature Te immediately after passing through the evaporator 9 becomes the predetermined temperature at step S100. Therefore, when the post-evaporator air temperature Te is higher than the predetermined temperature and when the refrigerant pressure Pd discharged from the compressor 100 becomes larger than the predetermined pressure P1, an increase/decrease change of the theoretical flow amount of refrigerant discharged from the compressor 100 is repeated, and the control operation of the refrigerant cycle of the vehicle air conditioner 1 may become unstable.

Figure 14:
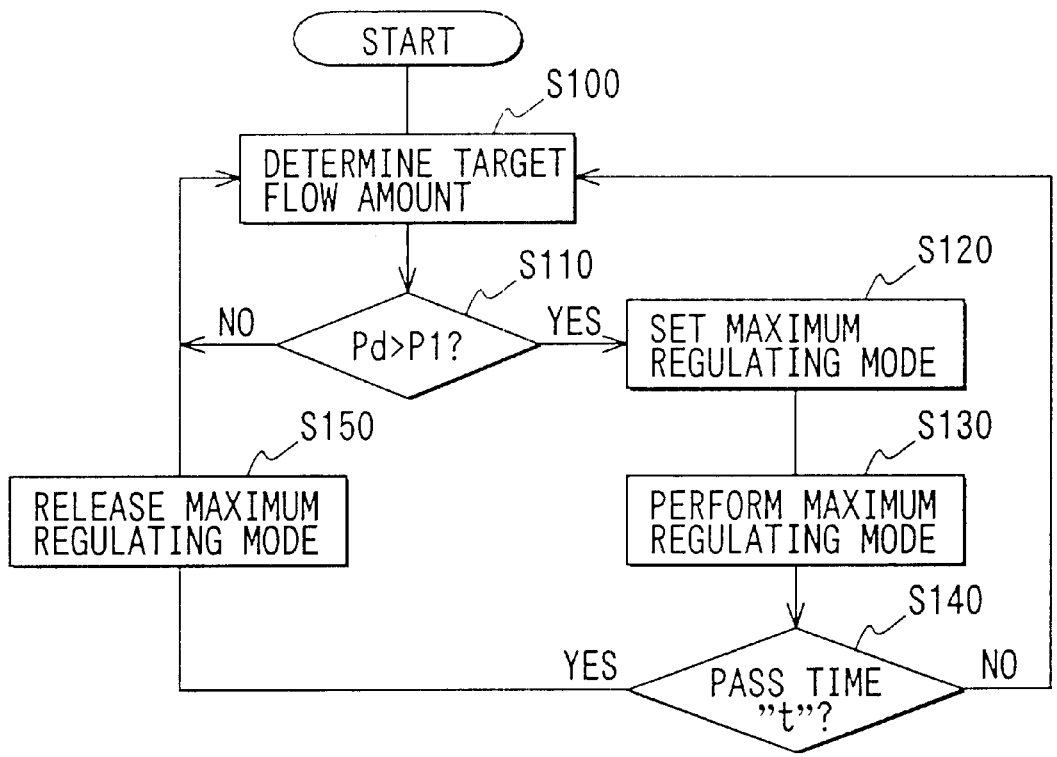
FIG. 14 is a flow diagram showing a control operation of an air conditioner according to a fifth preferred embodiment of the present invention.

Accordingly, in the fifth embodiment of the present invention, as shown in FIG. 14, when the refrigerant pressure Pd detected by the pressure sensor 27 becomes larger than the predetermined value P1 at step S110, the control current value (duty ratio) for obtaining the determined target flow amount is reduced in the maximum flow-amount regulating mode at step S120, so that the theoretical flow amount is made smaller than that determined target flow amount. Next, at step S130, the reduced control current is set as the maximum current, and the maximum flow-amount regulating mode is performed. In the maximum flow-amount regulating mode, the target flow amount of refrigerant discharged from the compressor 100 is determined in a range equal to or lower than the maximum flow amount, while the post-evaporator air temperature Te becomes the predetermined temperature.

Next, at step S140, it is determined whether or not a predetermined time "It" passes after the maximum flow amount regulating mode is performed. When the predetermined time "t" passes after the maximum flow-amount regulating mode is performed, the maximum flow-amount regulating mode is released at step S150. Thereafter, at step S100, the target flow amount of refrigerant discharged from the compressor 100 is determined so that the post-evaporator temperature Te becomes the predetermined temperature. The target flow amount of refrigerant discharged from the compressor 100 is controlled in the range equal to or lower than the maximum flow amount. Therefore, an actual post-evaporator temperature Te may be larger than the predetermined temperature. However, because a temperature change in air blown into the passenger compartment is made smaller, air-conditioning feeling given to a passenger in the passenger compartment is hardly decreased.

Accordingly, it can restrict the control operation of the vehicle air conditioner from being unstable, and it can prevent the high-pressure side refrigerant of the refrigerant cycle of the air conditioner 1 from having an abnormal high pressure or an abnormal high temperature.

Although the present invention has been fully described in connection with the preferred embodiments thereof with reference to the accompanying drawings, it is to be noted that various changes and modifications will become apparent to those skilled in the art.

Figure 15:
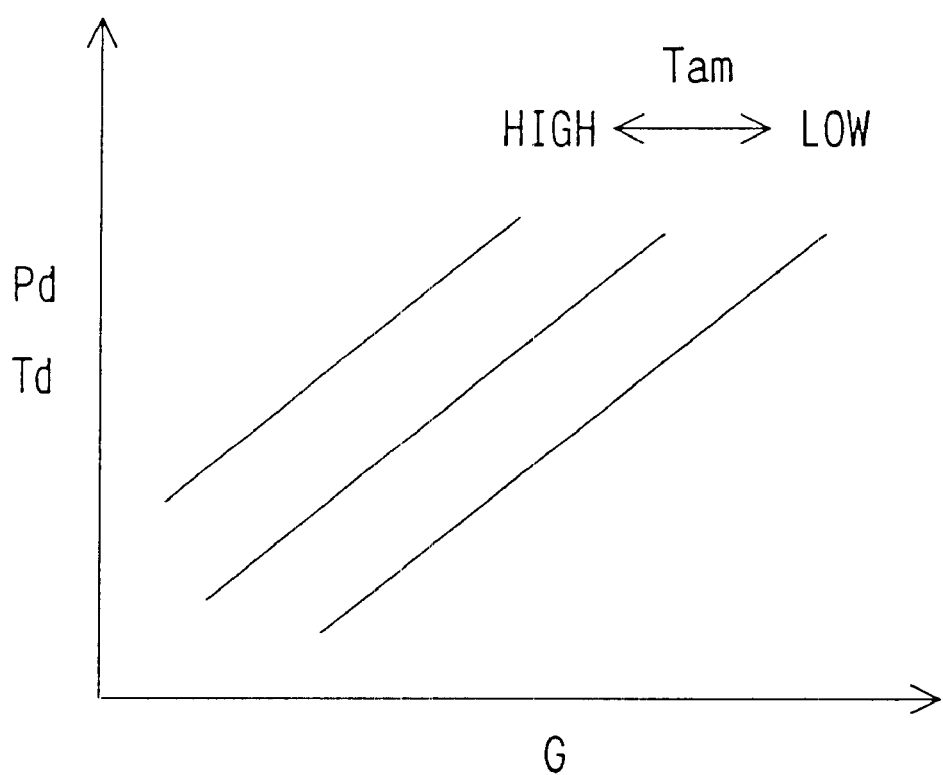
FIG. 15 is a graph showing relationships between a refrigerant flow amount G, a refrigerant pressure Pd and a refrigerant temperature Td discharged from a compressor, when an outside air temperature Tam is changed, according to a modification of the present invention.
Figure 16:
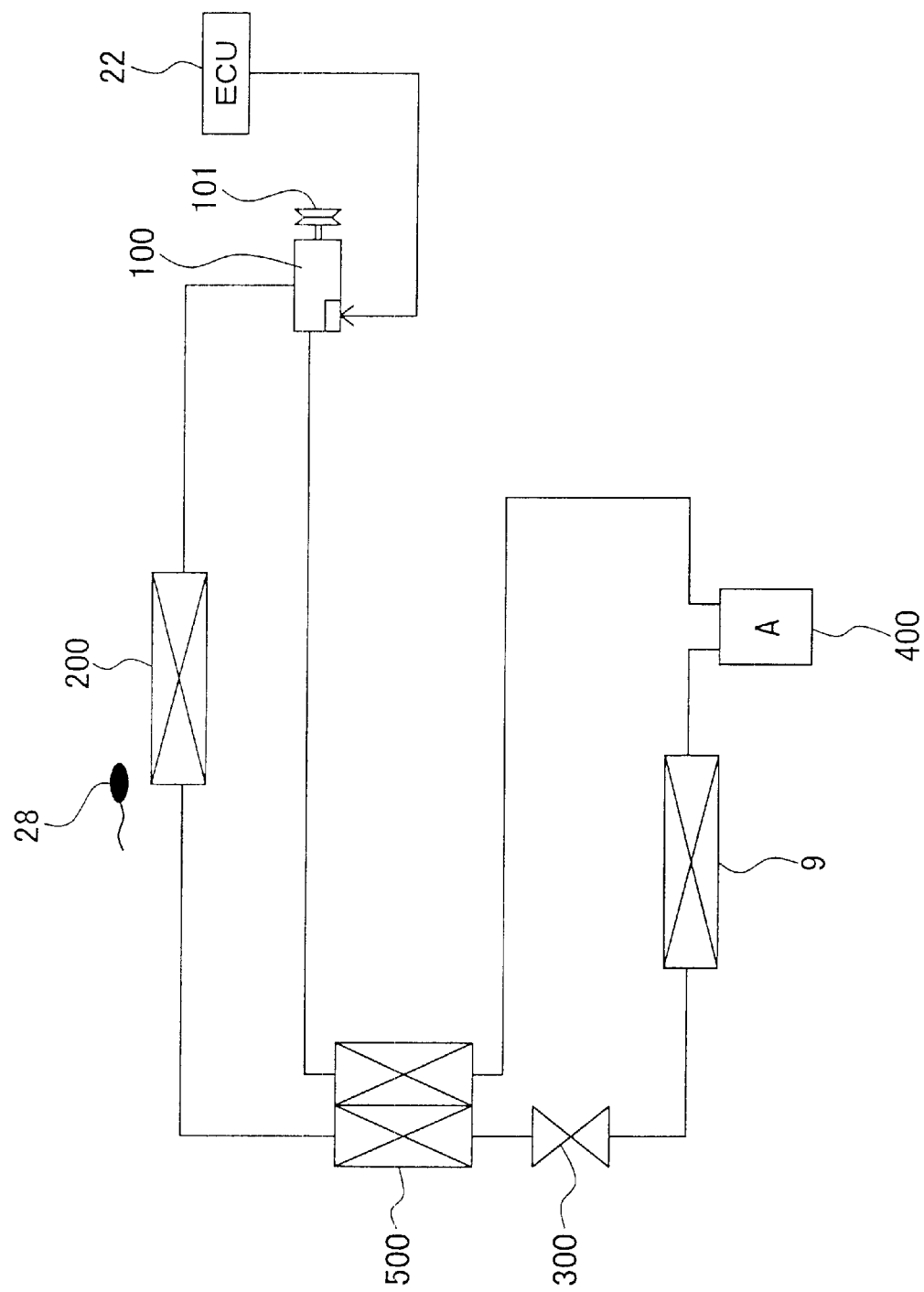
FIG. 16 is a schematic diagram showing a refrigerant cycle used for an air conditioner according to an another modification of the present invention.

For example, because the refrigerant pressure Pd and the refrigerant temperature Td, discharged from the compressor 100 have an interrelation, the refrigerant pressure Pd can be estimated based on the refrigerant temperature Td detected by a temperature sensor. In addition, when the same refrigerant amount circulates in the refrigerant cycle, the refrigerant pressure Pd and the refrigerant temperature Td discharged from the compressor 100 increase as the outside air temperature Tam increases, as shown in FIG. 15. Accordingly, as shown in FIG. 16, an outside air temperature sensor 28 for detecting the outside air temperature Tam blown toward the radiator 200 is provided, and a relationship between the outside air temperature Tam and the refrigerant pressure Pd discharged from the compressor 100 can be calculated beforehand. Thereafter, the theoretical flow amount of refrigerant discharged from the compressor 100 can be controlled based on the outside air temperature Tam detected by the outside air temperature sensor 28.

In the above-described embodiments, the present invention is applied to a refrigerant cycle performing only the cooling operation. However, the present invention described in each of the embodiments can be used for a heat pump cycle which can selectively switch a cooling operation, a heating operation, or a dehumidifying mode. In the above-described first embodiment, the swash plate compressor is used. However, the other type compressor such as a scroll compressor can be used.

In the above-described embodiments, the maximum flow-amount regulating means (control unit), for preventing the flow amount of refrigerant discharged from the compressor 100 from being larger than the predetermined flow amount Wt, is constructed by the control valve 110 and the ECU 22 in a variable-displacement compressor. However, in a fixed-displacement compressor where the displacement cannot be changed, an electromagnetic clutch is controlled to control operation ratio (a ratio between operation time and non-operation time) of the compressor, so that the displacement of the compressor can be changed in a predetermined time and the maximum flow-amount regulating means can also be constructed.

In the above-described first embodiment, while the post-evaporator air temperature Te (immediately after passing through the evaporator 9) detected by the temperature sensor 26 becomes approximately 0° C., it can prevent the refrigerant flow amount discharged from the compressor 100 from being larger than the predetermined flow amount Wt. Accordingly, in a case where the rotation speed of the compressor 100 becomes larger than a predetermined rotation speed (e.g., a rotation speed corresponding to. a vehicle speed of 40 km/h), by an ON/OFF control of the electromagnetic clutch 101, the rotation speed of the compressor 100 can be made approximately constant during a predetermined time.

In the above-described first embodiment, the past-evaporator air temperature Te is detected by the temperature sensor 26 for controlling the compressor 100. However, because the pressure (evaporation pressure) within the evaporator 9 has a relationship with the temperature (evaporation temperature) within the evaporator 9, when the refrigerant pressure sucked into the compressor 100 is made substantially constant, it can prevent the refrigerant flow amount discharged from the compressor 100 from being larger than the predetermined flow amount Wt.

In the above-described first embodiment, the air temperature Te (immediately after passing through the evaporator 9) detected by the temperature sensor 26 is made to become approximately 0° C., so that it can prevent the refrigerant flow amount discharged from the compressor 100 from being larger than the predetermined flow amount Wt. However, by setting the target flow amount discharged from the compressor based on the outside air temperature Tam or the sunlight amount, the duty ratio can be determined so that the refrigerant flow amount discharged from the compressor 100 can be prevented from being larger than the predetermined flow amount Wt. In the above-described first embodiment, the duty-control is performed for the control valve 110. However, PWM (Pulse Width Modulation) control or the other control may be performed for the control valve 110.

Further, in the above-described embodiments, the carbon dioxide is used as refrigerant. However, the other refrigerant such as ethylene, ethane, nitrogen oxide may be used.

Such changes and modifications are to be understood as being within the scope of the present invention as defined by the appended claims.

What is claimed is:

1. An air conditioner for a vehicle having an engine for powering the vehicle, the air conditioner comprising:

a refrigerant cycle having a compressor rotated by power from the engine, a rotational speed and capacity of the compressor being directly related to a rotational speed of the engine, the compressor being disposed to suck and compress refrigerant so that refrigerant discharged from the compressor has a pressure equal to or higher than critical pressure of the refrigerant; and a control unit which is provided to prevent a flow amount of the refrigerant discharged from the compressor from becoming larger than a predetermined value, as the rotational speed of the compressor is increased due to an increase in the rotational speed of the engine.

2. The air conditioner according to claim 1, wherein:

the compressor is a variable-displacement compressor in which a theoretical flow amount of the refrigerant discharged from the compressor is variable; and the control unit controls the theoretical flow amount of the refrigerant discharged from the compressor to prevent the flow amount of refrigerant discharged from the compressor from being larger than the predetermined value.

3. The air conditioner according to claim 1, further comprising:

a fixed throttle provided at a refrigerant discharge side of the compressor, wherein:

the compressor is a variable-displacement compressor in which a theoretical flow amount of the refrigerant discharged from the compressor is changed based on a pressure difference between upstream and downstream sides of the fixed throttle in a refrigerant flow direction.

4. The air conditioner according to claim 1, wherein the control unit is set in such a manner that the flow amount of the refrigerant discharged from the compressor has an upper limit.

5. The air conditioner according to claim 3, wherein:

the compressor has a swash plate chamber in which a swash plate is disposed;

the swash plate chamber of the compressor is provided in such a manner that a pressure of the swash plate chamber is changed in accordance with the pressure difference; and the control unit changes the flow amount of the refrigerant discharged from the compressor based on the pressure of the swash plate chamber.

6. The air conditioner according to claim 3, further comprising
a detecting unit disposed to detect a physical amount relative to a refrigerant pressure of the refrigerant discharged from the compressor; and
the control unit controls the theoretical flow amount of the refrigerant discharged from the compressor in such a manner that the physical amount detected by the detecting unit is lower than a predetermined amount.

7. The air conditioner according to claim 6, wherein:
the refrigerant cycle further includes
a high-pressure side heat exchanger which is disposed to cool the refrigerant discharged from the compressor,
a decompression unit disposed to decompress the refrigerant flowing from the high-pressure side heat exchanger, and
a low-pressure side heat exchanger disposed to evaporate the refrigerant flowing from the decompression unit;
the control unit includes target flow amount determining means which determines a target flow amount of the refrigerant discharged from the compressor based on at least one heat load of the high-pressure side heat exchanger and the low-pressure side heat exchanger; and
when the physical amount detected by the detecting unit is larger than the predetermined amount, the control unit performs a maximum flow-amount regulating mode, in which the target flow amount of the refrigerant discharged from the compressor is set in a range equal to or lower than a maximum flow amount, and the theoretical flow amount of the compressor is controlled based on the target flow amount so that the physical amount detected by the detecting unit becomes lower than the predetermined amount.

8. The air conditioner according to claim 7, wherein the control unit stops the maximum flow-amount regulating mode when a predetermined time passes after the maximum flow-amount regulating mode is performed.

9. The air conditioner according to claim 1, wherein the refrigerant is carbon dioxide.

10. The air conditioner according to claim 1 wherein the control unit mechanically controls the flow amount of the refrigerant discharged from the compressor to be lower than the predetermined value, so that the pressure of the refrigerant discharged from the compressor is controlled to be lower than a predetermined pressure that is equal to or higher than the critical pressure of the refrigerant.

11. An air conditioner for a vehicle having an engine for powering the vehicle, the air conditioner comprising:
a refrigerant cycle having a variable-displacement compressor rotated by power from the engine, a rotational speed and capacity of the compressor being directly related to a rotational speed of the engine, the compressor being disposed to suck and compress refrigerant so that the refrigerant discharged from the compressor has a pressure equal to or higher than critical pressure of the refrigerant;
a fixed throttle disposed at a refrigerant discharge side of the compressor; and
a control unit which changes a theoretical flow amount of the refrigerant discharged from the compressor based on a pressure difference between upstream and downstream sides of the fixed throttle in a refrigerant flow direction; wherein:
the control unit is set in such a manner that the flow amount of the refrigerant discharged from the compressor has an upper limit as the rotational speed of the compressor is increased due to an increase in the rotational speed of the engine.

12. The air conditioner according to claim 10, wherein:
the compressor has a swash plate chamber in which a swash plate is disposed;
the swash plate chamber is provided in such a manner that a pressure of the swash plate chamber is changed in accordance with the pressure difference; and
the control unit changes the flow amount of the refrigerant discharged from the compressor based on the pressure of the swash plate chamber.

13. The air conditioner according to claim 10, further comprising
a detecting unit disposed to detect a physical amount relative to a refrigerant pressure of the refrigerant discharged from the compressor; and
wherein the control unit controls the theoretical flow amount of the refrigerant discharged from the compressor in such a manner that the physical amount detected by the detecting unit is lower than a predetermined amount.

14. The air conditioner according to claim 13, wherein:
the refrigerant cycle further includes
a high-pressure side heat exchanger which is disposed to cool the refrigerant discharged from the compressor,
a decompression unit disposed to decompress the refrigerant flowing from the high-pressure side heat exchanger, and
a low-pressure side heat exchanger disposed to evaporate the refrigerant flowing from the decompression unit;
the control unit includes target flow-amount determining means which determines a target flow amount of the refrigerant discharged from the compressor based on at least one heat load of the high-pressure side heat exchanger and the low-pressure side heat exchanger; and
when the physical amount detected by the detecting unit is larger than the predetermined amount, the control unit performs a maximum flow-amount regulating mode, in which the target flow amount of the refrigerant discharged from the compressor is set in a range equal to or lower than a maximum flow amount, and the theoretical flow amount of the compressor is controlled based on the target flow amount so that the physical amount detected by the detecting unit becomes lower than the predetermined amount.

15. The air conditioner according to claim 14, wherein the control unit stops the maximum flow-amount regulating mode when a predetermined time passes after the maximum flow-amount regulating mode is performed.

16. The air conditioner according to claim 10, wherein the refrigerant is carbon dioxide.

17. A refrigerant cycle comprising:
a rotary compressor disposed to suck and compress the refrigerant so that refrigerant discharged from the compressor has a pressure equal to or higher than critical pressure of refrigerant;
a high-pressure side heat exchanger which is disposed to cool the refrigerant discharged from the compressor;

a decompression unit disposed to decompress the refrigerant flowing from the high-pressure side heat exchanger;

a low-pressure side heat exchanger disposed to evaporate the refrigerant flowing from the decompression unit; and a control unit which is mechanically connected to the compressor and is disposed to prevent a flow amount of the refrigerant discharged from the compressor from becoming larger than a predetermined value as a rotational speed of the compressor is increased.

18. The refrigerant cycle according to claim 17, further comprising a fixed throttle disposed at a refrigerant discharge side of the compressor, wherein:

the compressor is a variable-displacement compressor in which a theoretical flow amount of the refrigerant discharged from the compressor is variable; and the control unit changes the theoretical flow amount of the refrigerant discharged from the compressor based on a pressure difference between upstream and downstream sides of the fixed throttle in a refrigerant flow direction.

19. The refrigerant cycle according to claim 18, further comprising:

a detecting unit disposed to detect a physical amount relative to a refrigerant pressure of the refrigerant discharged from the compressor, wherein the control unit controls the theoretical flow amount of the refrigerant discharged from the compressor in such a manner that the physical amount detected by the detecting unit is lower than a predetermined amount.

20. The refrigerant cycle according to claim 19, wherein:

the control unit includes target flow-amount determining means which determines a target flow amount of the refrigerant discharged from the compressor based on at least one heat load of the high-pressure side heat exchanger and the low-pressure side heat exchanger; and when the physical amount detected by the detecting unit is larger than the predetermined amount, the control unit performs a maximum flow-amount regulating mode in which the target flow amount of the refrigerant discharged from the compressor is set in a range equal to or lower than a maximum flow amount, and the theoretical flow amount of the compressor is controlled based on the target flow amount so that the physical amount detected by the detecting unit becomes lower than the predetermined amount.

21. The refrigerant cycle according to claim 17, wherein the refrigerant is carbon dioxide.

* * * * *